United States Patent
Zhu

(10) Patent No.: US 12,526,641 B2
(45) Date of Patent: Jan. 13, 2026

(54) CHANNEL ASSESSMENT METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 467 days.

(21) Appl. No.: 17/997,112

(22) PCT Filed: Apr. 29, 2020

(86) PCT No.: PCT/CN2020/087872
§ 371 (c)(1),
(2) Date: Oct. 25, 2022

(87) PCT Pub. No.: WO2021/217517
PCT Pub. Date: Nov. 4, 2021

(65) Prior Publication Data
US 2023/0171606 A1 Jun. 1, 2023

(51) Int. Cl.
*H04W 16/14* (2009.01)
*H04B 17/336* (2015.01)

(52) U.S. Cl.
CPC .......... *H04W 16/14* (2013.01); *H04B 17/336* (2015.01)

(58) Field of Classification Search
CPC ............................. H04W 16/14; H04B 17/336
See application file for complete search history.

(56) References Cited

U.S. PATENT DOCUMENTS

| 11,324,042 | B2* | 5/2022 | Nam | H04W 56/0015 |
| 11,849,482 | B2* | 12/2023 | Damnjanovic | H04W 74/0816 |
| 2009/0207747 | A1* | 8/2009 | Kim | H04L 43/0811 370/252 |
| 2010/0219884 | A1* | 9/2010 | Fujii | H04L 27/2624 327/560 |
| 2016/0233989 | A1* | 8/2016 | Belghoul | H04W 72/20 |
| 2017/0041951 | A1* | 2/2017 | Yin | H04W 16/10 |
| 2018/0041906 | A1* | 2/2018 | Jang | H04W 16/14 |
| 2021/0378013 | A1* | 12/2021 | Jiang | H04W 74/0816 |
| 2022/0322429 | A1* | 10/2022 | Zhu | H04W 74/0808 |

FOREIGN PATENT DOCUMENTS

| CN | 110506433 | * 11/2009 |
| CN | 105580465 A | 5/2016 |
| CN | 105634859 A | 6/2016 |

(Continued)

OTHER PUBLICATIONS

"Report of 3GPP TSG RAN meeting #75," Proceedings of the 3GPP TSG RAN meeting #76, ETSI MCC, RP-171409, Jun. 5, 2017, West Palm Beach, California, 189 pages.

(Continued)

*Primary Examiner* — Zhiren Qin
(74) *Attorney, Agent, or Firm* — McCoy Russell LLP

(57) ABSTRACT

A channel assessment method includes: performing channel assessment in a shared spectrum, and alternatively, determining a channel resource occupied in the shared spectrum according to an interference condition between communication systems.

16 Claims, 6 Drawing Sheets

(56) References Cited

FOREIGN PATENT DOCUMENTS

| | | |
|---|---|---|
| CN | 105684488 B | 6/2016 |
| CN | 106851662 A | 6/2017 |
| CN | 107005862 A | 8/2017 |
| CN | 109219151 A | 1/2019 |
| CN | 110324910 A | 10/2019 |
| CN | 110474700 A | 11/2019 |
| CN | 110495242 A | 11/2019 |
| CN | 110506433 A | 11/2019 |
| EP | 3454474 A1 | 3/2019 |
| WO | 2015047849 A2 | 4/2015 |
| WO | 2016112508 A1 | 7/2016 |
| WO | 2017024629 A1 | 2/2017 |
| WO | 2019001160 A1 | 1/2019 |

OTHER PUBLICATIONS

"Final Report of 3GPP TSG RAN WG1 #92 v1.0.0," Proceedings of the 3GPP TSG RAN WG1 Meeting #92bis, MCC Support, R1-1803571, Apr. 16, 2018, Sanya, China, 187 pages.

\* cited by examiner

CHANNEL ASSESSMENT METHOD AND APPARATUS, COMMUNICATION DEVICE, AND STORAGE MEDIUM

CROSS REFERENCE TO RELATED APPLICATION

The present application is a U.S. National Phase of International Application No. PCT/CN2020/087872 entitled "CHANNEL ASSESSMENT METHOD AND APPARATUS, COMMUNICATION DEVICE, AND STORAGE MEDIUM," and filed on Apr. 29, 2020. The entire contents of the above-listed application are hereby incorporated by reference for all purposes.

BACKGROUND

Increasing mobile devices and booming mobile Internet have brought about exploding mobile data, which lead to higher requirements for the traffic density, network capacity, user rate, time delay, etc. In order to tackle the challenge, the 5th Generation (5G) mobile communication new radio (NR) has been a new radio designed for new scenes and spectra.

SUMMARY

The disclosure provides a channel assessment method and apparatus, a communication device, and a storage medium.

In a first aspect, an example of the disclosure provides a channel assessment method that is applied to first user equipment (UE). The method includes:
performing channel assessment in a shared spectrum, and alternatively, determining a channel resource occupied in the shared spectrum according to an interference condition between communication systems.

In a second aspect, an example of the disclosure provides a communication device. The device includes a processor, a transceiver, a memory, and an executable program that is stored in the memory and runnable by the processor, the processor is configured to execute the executable program to:
perform channel assessment in a shared spectrum, and alternatively, determine a channel resource occupied in the shared spectrum according to an interference condition between communication systems.

In a third aspect, an example of the disclosure provides a non-transitory computer-readable storage medium that stores an executable program, a processor is configured to execute the executable program to:
perform channel assessment in a shared spectrum, and alternatively, determine a channel resource occupied in the shared spectrum according to an interference condition between communication systems.

It is to be understood that both the above general description and the following detailed description are merely illustrative and explanatory and not intended to limit the examples of the disclosure.

BRIEF DESCRIPTION OF THE DRAWINGS

The accompanying drawings, which are incorporated in the description and constitute a part of the description, illustrate examples consistent with the disclosure and serve to explain principles of examples of the disclosure along with the description.

DETAILED DESCRIPTION

Examples will be described in detail here and shown in the accompanying drawings illustratively. When the following descriptions relate to the accompanying drawings, unless otherwise specified, the same numeral in different accompanying drawings denotes the same or similar element. The implementations described in the following examples do not denote all implementations consistent with the examples of the disclosure. On the contrary, the implementations are merely examples of an apparatus and a method consistent with some aspects in the examples of the disclosure, as recited in the appended claims.

The terms used in the examples of the disclosure are merely to describe specific examples, instead of limiting the examples of the disclosure. The singular forms such as "a", "the", and "this" used in the examples of the disclosure and the appended claims are also intended to include the plural forms, unless otherwise clearly stated in the context. It is also to be understood that the term "and/or" used here refers to and includes any of one or more of the associated listed items or all possible combinations.

It is to be understood that although the terms such as "first", "second" and "third" may be used in the examples of the disclosure to describe various information, such information is not limited to the terms. The terms are merely used for distinguishing the same type of information from one another. For example, first information may also be referred to as second information, and similarly, second information may also be referred to as first information, without departing from the scope of the examples of the disclosure. Depending on the context, the word "if" as used here may be interpreted as "at the time of" or "when", or "in response to determining".

The disclosure relates to, but is not limited to, the technical field of radio communication, and particularly relates to a channel assessment method and apparatus, a communication device, and a storage medium.

A mobile communication network faces increasing lack of spectrum resources. A licensed spectrum, especially a highly-valued low-spectrum resource, has limited bandwidth and is being rapidly consumed by growing user groups. A research plan on the new radio in unlicensed spectrum (NR-U) is proposed to cope with the challenge of spectrum shortage and to increase system capacity, the unlicensed spectrum may also be referred to as a shared spectrum. The NR-U unloads traffic of a licensed spectrum to a shared spectrum, to relieve pressure of the licensed spectrum.

Figure 1:
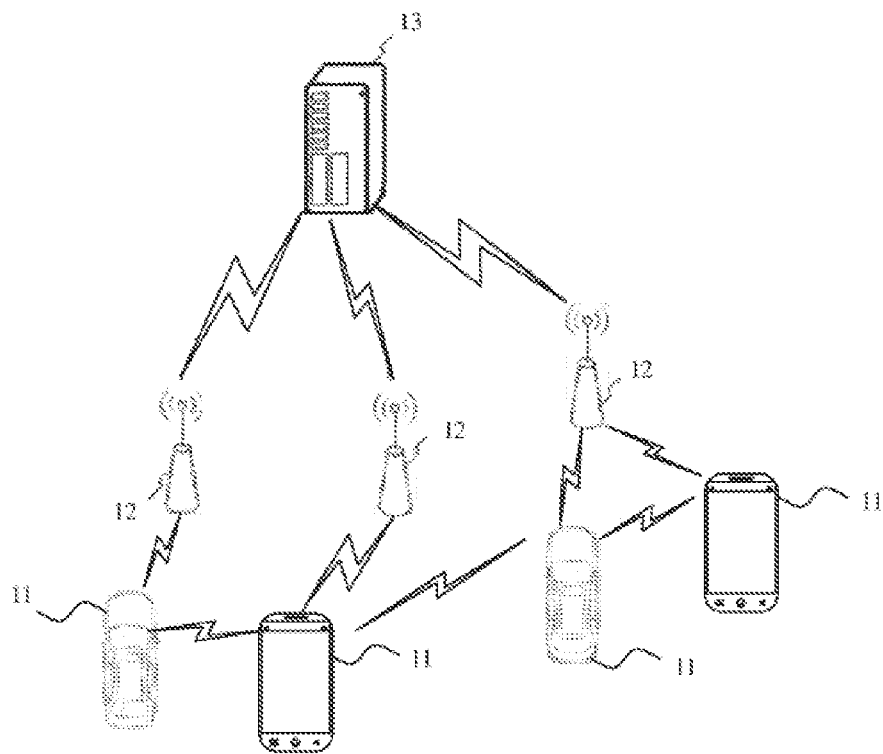
FIG. 1 is a schematic structural diagram of a radio relay communication system shown according to an example.

FIG. 1 shows a schematic structural diagram of a radio communication system provided by an example of the disclosure. As shown in FIG. 1, the radio communication system is based on a cellular mobile communication technology, and may include: several terminals 11 and several base stations 12.

The terminals 11 may be devices providing voice and/or data connectivity for a user. The terminals 11 may communicate with one or more core networks via a radio access network (RAN). The terminals 11 may be Internet of Things terminals, such as sensor devices and mobile phones (or "cellular" phones), and computers having Internet of Things terminals, for example, may be stationary, portable, pocket, handheld, intra-computer, or vehicle-mounted apparatuses. For example, the terminals may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminals 11 may also be unmanned aerial vehicles. Alternatively, the terminals 11 may also be vehicle-mounted devices, for example, electronic control units having a radio communication function, or radio communication devices externally connected to the electronic control units. Alternatively, the terminals 11 may also be roadside devices, for example, street lamps, signal lamps, etc. having a radio communication function.

The base stations 12 may be network-side devices in the radio communication system. The radio communication system may be a 4th generation mobile communication (4G) system, which is also called a long term evolution (LTE) system. Alternatively, the radio communication system may also be a 5th generation mobile communication (5G) system, which is also called a new radio (NR) system or a 5G NR system. Alternatively, the radio communication system may also be a next generation system following the 5G system. An access network of the 5G system may be called a new generation-radio access network (NG-RAN), or a machine-type communication (MTC) system.

The base stations 12 may be evolved nodes B (eNBs) used in the 4G system. Alternatively, the base stations 12 may be next generation nodes B (gNBs) using a centralized-distributed architecture in the 5G system. When using the centralized-distributed architecture, each of the base stations 12 generally includes a central unit (CU) and at least two distributed units (DUs). The central unit is provided with a protocol stack of a packet data convergence protocol (PDCP) layer, a radio link control (RLC) layer, and a media access control (MAC) layer. Each of the distributed units is provided with a protocol stack of a physical (PHY) layer. Specific implementations of the base stations 12 are not limited in the examples of the disclosure.

The base stations 12 are in radio connection with the terminals 11 by means of radio. In different implementations, the radio is based on a 4G standard, or a 5G standard, and is new radio, for example. Alternatively, the radio may also be based on a standard of a next generation mobile communication network technology following 5G.

In some examples, an end to end (E2E) connection may be further established between the terminals 11, For example, scenes such as vehicle to vehicle (V2V) communication, vehicle to infrastructure (V2I) communication, and vehicle to pedestrian (V2P) communication in vehicle to everything (V2X) communication are provided.

In some examples, the radio communication system may further include a network management device 13.

Several base stations 12 are each connected to the network management device 13. The network management device 13 may be a core network device in the radio communication system. For example, the network management device 13 may be a mobility management entity (MME) in an evolved packet core (EPC). Alternatively, the network management device may also be another core network device, such as a serving gateway (SGW), a public data network gateway (PGW), a policy and charging rules function (PCRF) or a home subscriber server (HSS), etc. An implementation form of the network management device 13 is not limited in the examples of the disclosure.

Execution entities involved in the example of the disclosure include, but are not limited to, UE such as terminals supporting new radio in shared spectrum (NR-U), base stations for cellular mobile communication, etc.

Figure 2:
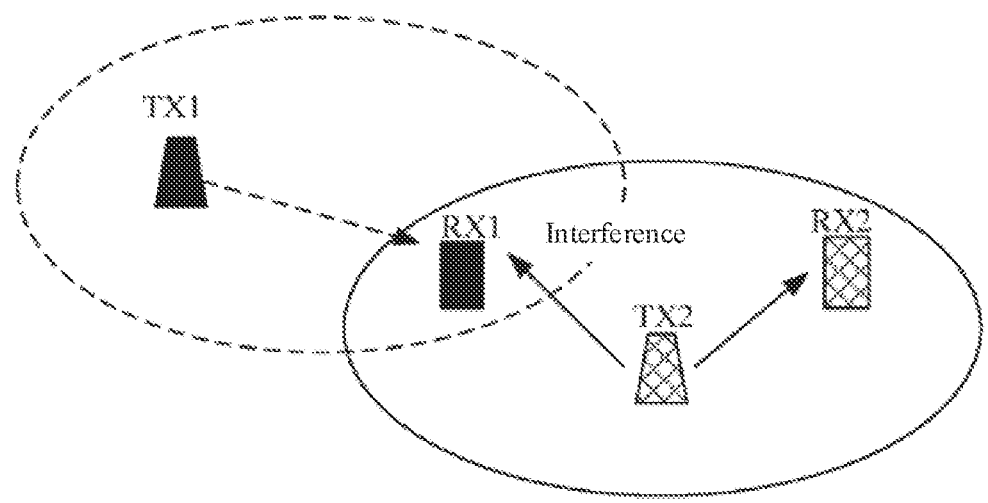
FIG. 2 is a schematic diagram of interference between communication systems shown according to an example.

According to application scenes of the example of the disclosure, despite a wealth of shared spectrum resources, the listen before talk (LBT) technology based on clear channel assessment (CCA) is introduced into the license assisted access (LAA) in order to guarantee fair coexistence between different radio access technologies (RATs) using a shared spectrum resource, and it is of importance to introduce LBT into the NR-U to guarantee the fair coexistence. However, the current LBT technology may merely detect a channel condition around a sender, and the sender cannot know a channel condition around a receiver before data transmission, which may cause a hidden node problem. As shown in FIG. 2, a base station Tx1 needs to send data to a user Rx1, and in this case, a base station Tx2 is performing downlink transmission to a user Rx2. Since the base station Tx1 cannot detect transmission by the base station Tx2, the base station Tx1 may send data to the user Rx1 after LBT succeeds. However, in this case, the transmission by the base station Tx2 may interfere with the user Rx1 serving as a receiver.

Figure 3:
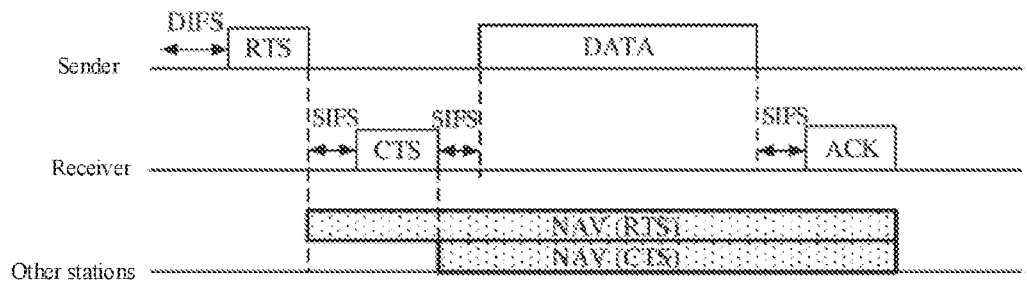
FIG. 3 is a schematic diagram of receiver assisted listen before talk (LBT) shown according to an example.

In order to solve the hidden node problem in the NR-U, research on enhanced receiver assisted LBT is agreed at meeting 3rd generation partnerships project (3GPP) RAN 1#92bis, for example, a request to send/clear to send (RTS/CTS) mechanism in IEEE 802.11 is introduced. The sender and the receiver shake hands by exchanging RTS and CTS, and clear channels around the sender and the receiver before completing data transmission and corresponding feedback through time fields included in the RTS and CTS. As shown in FIG. 3, after determining that a channel is clear through carrier sense, and performing back-off by distributed inter-frame spacing (DIFS) time, the sender first sends the RTS to the receiver. A node of the RTS is sensed by surroundings of the sender to perform back-off according to network allocation vector (NAV) time as indicated. RTS NAV time includes total time required in a subsequent sending and feedback process. After receiving the RTS, the receiver feeds back the CTS to the sender after a short inter-frame spacing (SIFS) of 16 us. Other nodes of the CTS is sensed to perform back-off according to the NAV time as indicated. CTS NAV time is from the end of the CTS to completion of data sending and a corresponding one-time feed-back acknowledge (ACK).

The sender performs channel assessment in order to guarantee fair sharing in the shared spectrum. The sender may determine whether data may be sent by sensing whether a channel is clear in channel assessment time. However, operation of channel assessment is necessary only when there are communication systems that interfere with each other. For communication systems that do not interfere with each other, the operation of channel assessment is unnecessary and may reduce spectrum efficiency.

Figure 4:
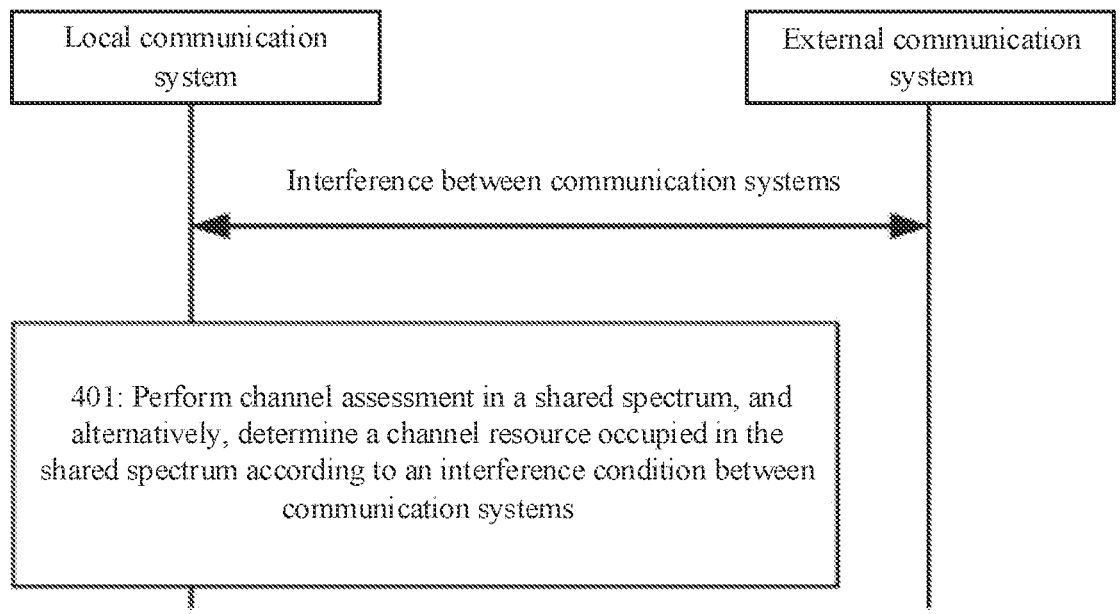
FIG. 4 is a schematic flow chart of a channel assessment method shown according to an example.

As shown in FIG. 4, the example provides a channel assessment method, which is applied to a base station or terminal of a local communication system, or other communication devices. The channel assessment method may include:

Step 401: channel assessment in a shared spectrum is performed, and alternatively, a channel resource occupied in the shared spectrum is determined according to an interference condition between communication systems.

Here, the local communication system may be a cellular mobile communication system. The local communication system may achieve data transmission by using the shared spectrum. The channel assessment method of the example may be executed by the base station or terminal of the local communication system, or other communication devices.

The interference condition between the communication systems may be interference generated when the local communication system and an external communication system jointly use the shared spectrum. The local communication system may be a current communication system that performs channel assessment by using the channel assessment method of the example. The local communication system may be the cellular mobile communication system, and the external communication system may be a cellular mobile communication system different from the local communication system or other types of communication systems. The external communication system that interferes with the local communication system may be any communication system that shares all or part of spectrum resources with the local communication system. For example, the local communication system and the external communication system may be cellular mobile communication systems of different operators; and alternatively, the external communication system may be a Wi-Fi communication system, etc.

Channel assessment may be clear channel assessment (CCA), and may be sensed by a base station or terminal in a communication system. In the channel assessment, the base station or terminal at the sender of the local communication system may sense, in the shared spectrum, whether a communication channel in the shared spectrum is occupied by the external communication system before sending data, so as to detect whether the channel is clear, that is, whether the channel is available.

In related art, even though there is no external communication system, the local communication system may perform channel assessment every time data is transmitted, such that communication efficiency is low, and then utilization efficiency of the shared spectrum is low.

Here, the base station or terminal in the local communication system may determine an interference condition of the external communication system and then perform channel assessment according to the interference condition. The interference condition between the communication systems may include: whether there is interference between the communication systems and/or an interference degree between the communication systems. For example, the interference condition between the communication systems may include the following conditions that there may be co-channel interference between two communication systems that simultaneously use the shared spectrum at a time point or not. In response to determining that there is co-channel interference at a time point, the interference condition may include an interference degree.

The base station or terminal in the local communication system may adjust channel assessment according to the interference condition. For example, in response to determining that there is no radio signal interference that interferes with the communication system in the shared spectrum, no channel assessment is performed, and alternatively, frequency of channel assessment is reduced, such that communication efficiency of the base station or terminal is improved. Alternatively, in response to determining that there is radio signal interference that interferes with the communication system in the shared spectrum, channel assessment is performed, and alternatively, frequency of channel assessment is increased, such that the situation that the communication quality is affected by radio signal interference is reduced.

The channel resource occupied in the shared spectrum may be a frequency domain resource and a time domain resource occupied by the base station or terminal in the local communication system in the shared spectrum, for example, the channel resource occupied in the shared spectrum may be a duration of a channel occupied in the shared spectrum, etc.

The base station or terminal in the local communication system may increase the duration of the channel occupied in the shared spectrum in response to determining that there is no radio signal interference that interferes with the communication system in the shared spectrum, such that a communication rate or a communication data volume may be increased, and communication efficiency may be improved. Alternatively, in response to determining that there is the radio signal interference that interferes with the communication system in the shared spectrum, a channel assessment operation may be executed to guarantee fair occupation of channel resources with other communication systems, such that the channel resource in the shared spectrum may be fully utilized, and the utilization efficiency of shared spectrum may be improved.

In this way, on the one hand, based on the interference condition between the communication systems, the channel assessment in the shared spectrum is performed, and a fixed channel assessment mode is no longer used, such that the channel assessment may adapt to a communication environment, channel assessment efficiency may be improved, and communication quality may be enhanced. On the other hand, based on the interference condition between the communication systems, the channel resource occupied in the shared spectrum is determined, such that the channel resource in the shared spectrum may be fully utilized, and the utilization efficiency of shared spectrum efficiency may be improved.

According to the channel assessment method and apparatus, and the storage medium provided by the examples of the disclosure, the communication device preform the channel assessment in the shared spectrum, and alternatively, determines the channel resource occupied in the shared spectrum according to the interference condition between the communication systems. In this way, on the one hand, based on the interference condition between the communication systems, the channel assessment in the shared spectrum is preformed, and a fixed channel assessment mode is no longer used, such that the channel assessment may adapt to a communication environment, channel assessment efficiency may be improved, and communication quality may be enhanced. On the other hand, based on the interference condition between the communication systems, the channel resource occupied in the shared spectrum is determined, such that the channel resource in the shared spectrum may be fully utilized, and the utilization of shared spectrum may be improved.

In an example, the base station or terminal in the local communication system may periodically determine the interference condition between the communication systems, and perform channel assessment in the shared spectrum according to the interference condition or occupy a resource of the shared spectrum. It is unnecessary to determine the interference condition between the communication systems every time a resource of a licensed spectrum needs to be occupied.

In an example, the base station or terminal in the local communication system may determine the interference condition between the communication systems when the resource of the shared spectrum needs to be occupied. According to the interference condition between the communication systems, channel assessment in the shared spectrum is dynamically performed, and alternatively, the resource of the shared spectrum is occupied. In an example, the step that channel assessment in a shared spectrum is performed according to an interference condition between systems includes:

the channel assessment in the shared channel is stopped in response to determining that there is no interference between the communication systems in the shared spectrum.

The sender, such as the base station or terminal, in the local communication system may stop channel assessment in response to determining that there is no radio signal from the external communication system that interferes with current communication in a current shared spectrum. Whether there is a radio signal that interferes with the communication system in the shared spectrum may be determined after measurement by an external device, and alternatively, whether there is interference between the communication systems may be determined based on a location of the external communication system and a location of the local communication system.

In this way, in response to determining that there is no interference between the communication systems, the base station or terminal may no longer perform channel assessment during data transmission, such that communication efficiency is improved, and then utilization efficiency of the shared spectrum is enhanced.

In an example, the step that the channel assessment is stopped in response to determining that there is no interference between the communication systems in the shared spectrum includes:

the channel assessment is stopped in response to determining that there is no interference between the communication systems in the shared spectrum according to configuration information; and alternatively, the channel assessment is stopped in response to determining that there is no interference between the communication systems in the shared spectrum according to a radio signal detection result of an external communication system.

The configuration information may be preset in the base station or terminal of the local communication system, and the base station or terminal may determine whether there is interference between the communication systems in the shared spectrum in a current communication environment of the base station or terminal according to the configuration information. Here, the current communication environment may include: a current geographical location, and/or a current communication time period, etc. In response to determining that there is no interference between the communication systems by the base station or terminal, the channel assessment is stopped. In response to determining that there is interference between the communication systems by the base station or terminal, the channel assessment may be performed.

For example, when deploying a base station, an operator may determine whether there is interference of an external communication system in a coverage area of the base station, and if not, information that there is no interference between the communication systems in the shared spectrum may be set in the configuration information of the base station. In this way, during communication, the base station may determine that there is no interference between the communication systems in the shared spectrum according to configuration information, and stop channel assessment.

The base station or terminal in the local communication system may further measure a radio signal from the external communication system. Based on a radio signal measurement result of the external communication system, whether there is interference between the communication systems is determined. In response to determining that there is no measured radio signal from the external communication system, channel assessment is stopped.

Here, feature information of the radio signal from the external communication system may be pre-configured in a measurement configuration file. The feature information of the radio signal from the external communication system may include: time of the radio signal, a period of the radio signal, a type of the radio signal, etc.

In an example, the step that it is determined that there is no interference between the communication systems in the shared spectrum according to a radio signal detection result of an external communication system includes at least one of the following:

it is determined that there is no interference between the communication systems in the shared spectrum in response to determining that no radio signal transmitted from the external communication system is detected in a measurement period; and it is determined that there is no interference between the communication systems in the shared spectrum in response to determining that it is not detected that the continuous number of radio signals transmitted from the external communication system is greater than or equal to a number threshold.

In order to improve detection accuracy of the radio signal transmitted from the external communication system, the measurement period may be preset. In response to determining that no radio signal transmitted from the external communication system is measured in the set measurement period, it is determined that there is no interference between the communication systems.

The radio signal transmitted from the external communication system may be further measured repeatedly. In response to determining that no radio signal transmitted from the external communication system is measured in N continuous times of measurement, it is determined that there is no interference between the communication systems. Here, N may be a positive integer.

In this way, measurement accuracy of the radio signal transmitted from the external communication system may be improved by measuring the radio signal transmitted from the external communication system in a time period or repeatedly.

In an example, the step that in response to determined that there is no interference between the communication systems in the shared spectrum according to configuration information includes at least one of the following:

it is determined that no external communication system uses the shared spectrum according to the configuration information; and it is determined that a channel resource of the shared spectrum used by the external communication system is different from a channel resource of the shared spectrum used by the local communication system according to the configuration information. The channel resource includes: a time domain resource and/or a frequency domain resource.

Here, the configuration information may indicate whether the external communication system uses the shared spectrum in a current communication environment of the local communication system.

The configuration information may further indicate a time domain resource of the shared spectrum used by the external communication system. In response to determining that the time domain resource of the shared spectrum used by the external communication system indicated by the configuration information is different from a time domain resource of the shared spectrum used by the local communication system, it may be determined that there is no interference between the communication systems in the shared spectrum.

The configuration information may further indicate a frequency domain resource of the shared spectrum used by the external communication system. The local communication system and the external communication system may occupy different frequency domain resources in the shared spectrum. In response to determining that the frequency domain resource of the shared spectrum used by the external communication system indicated by the configuration information is different from a frequency domain resource of the shared spectrum used by the local communication system, it may be determined that there is no interference between the communication systems in the shared spectrum. Here, the description that frequency domain resources are different may indicate that there is no overlap in frequency domain.

In an example, the channel resource of the shared spectrum used by the local communication system and the channel resource of the shared spectrum used by the external communication system are agreed by the local communication system and the external communication system; and alternatively, the channel resource of the shared spectrum used by the local communication system and the channel resource of the shared spectrum used by the external communication system are preset.

When different cellular communication systems interfere with each other, communication resources of the local communication system and the external communication system in the shared spectrum may be coordinated, such that the communication resources of the local communication system and the external communication system are different, and then channel assessment is avoided.

For example, when base stations belonging to different operators interfere with each other, the base stations may coordinate a time domain resource and/or a frequency domain resource of each base station in the shared spectrum through interfaces between the base stations. In this way, the base stations do not interfere with each other when using the shared spectrum.

Alternatively, when a base station of Operator 1 finds an interfering base station of Operator 2, the base station may work according to a preset communication resource. Here, the communication resource may be allocated based on a resource allocation pattern.

In an example, the step that channel assessment in a shared spectrum is performed according to an interference condition between communication systems includes:

an assessment parameter is determined according to the interference condition between the communication systems in response to determining that there is interference between the communication systems in the shared spectrum; and channel assessment in the shared spectrum is performed according to the assessment parameter.

Here, the assessment parameter for channel assessment may be determined based on the interference condition between the communication systems. The assessment parameter may include frequency of channel assessment, a back-off parameter and/or an energy detection threshold, etc.

The assessment parameter for channel assessment may be configured based on the interference condition between the communication systems. For example, in response to determining that there is no interference between the communication systems in the shared spectrum, the number of channel assessment, or frequency of assessment, or the back-off parameter may be reduced.

In this way, channel assessment is no longer performed based on a fixed assessment parameter, such that channel assessment may adapt to a communication environment, channel assessment efficiency may be improved, and communication efficiency may be enhanced.

In an example, the step that an assessment parameter is determined according to the interference condition between the communication systems includes:

an assessment parameter for current channel assessment is determined according to the interference condition between the communication systems assessed through historical channel assessment.

Here, based on a result of previous historical channel assessment, the assessment parameter for the following current channel assessment may be determined. The historical channel assessment and the current channel assessment may be a plurality of adjacent times (for example, two times) of channel assessment.

In response to determining that interference between the communication systems in the shared spectrum is assessed through the historical channel assessment, it may be determined that a probability of detecting that there is interference between the communication systems in the shared spectrum through the current channel assessment is high. Thus, the energy detection threshold of channel assessment may be lowered, and a sensitivity of interference between the communication systems may be improved. It is ensured that there is no interference between the communication systems during communication.

In an example, the assessment parameter includes: a back-off parameter.

Here, the back-off parameters can include the number of back-off, a back-off duration, etc.

In response to determining that there is interference between the communication systems in the shared spectrum in a channel assessment process of the base station or terminal of the local communication system, back-off may be performed, that is, data transmission may be stopped, and channel assessment may be performed after a time period, where waiting time may be a back-off window. The number of back-off may be the number of back-off windows. The back-off duration may be a duration of a back-off window.

A back-off parameter for the current channel assessment may be determined according to interference between the communication systems assessed through the historical channel assessment. For example, in response to determining that interference between the communication systems in the shared spectrum is assessed through the historical channel assessment, it may be determined that a probability of detecting that there is interference between the communication systems in the shared spectrum through the current channel assessment is high, such that the number of back-off windows for the current channel assessment may be increased to reduce the number of channel assessment.

In this way, the back-off parameter may be flexibly adjusted, is not fixed to a same back-off parameter and may adapt to different transmission environments.

In an example, the back-off parameter includes: a back-off duration.

The step that an assessment parameter for current channel assessment is determined according to the interference condition between the communication systems assessed through historical channel assessment includes:

a back-off duration of the current channel assessment is reduced in response to determining that no interference between the communication systems in the shared spectrum is assessed through the historical channel assessment; and the back-off duration of the current channel assessment is increased in response to determining that interference between the communication systems in the shared spectrum is assessed through the historical channel assessment.

In response to determining that interference between the communication systems in the shared spectrum is assessed through the historical channel assessment, it may be determined that a probability of detecting that there is interference between the communication systems in the shared spectrum through the current channel assessment is high, such that a back-off duration of the current channel assessment may be prolonged, interval time of subsequent channel assessment may be prolonged, and time may be left for communication transmission of the external communication system.

In response to determining that interference between the communication systems in the shared spectrum is assessed through the historical channel assessment, it may be determined that a probability of detecting that there is interference between the communication systems in the shared spectrum through the current channel assessment is lower, such that a back-off duration of the current channel assessment may be shortened, interval time of subsequent channel assessment may be shortened, a communication delay may be reduced, and communication efficiency may be improved.

In an example, the step that a channel resource occupied in the shared spectrum is determined according to an interference condition between communication systems includes:

a duration of a transmission opportunity in the shared spectrum is determined according to the interference condition between the communication systems.

The base station or terminal of the local communication system may increase or decrease the duration of the transmission opportunity in the shared spectrum according to the interference condition between the communication systems.

In this way, the duration of the transmission opportunity is adjusted according to the interference condition, a fixed duration of the transmission opportunity is no longer used, and flexibility of setting the duration of the transmission opportunity is improved.

In an example, the step that a duration of a transmission opportunity in the shared spectrum is determined according to the interference condition between the communication systems includes:

the duration of the transmission opportunity is increased in response to determining that no interference between the communication systems in the shared spectrum is assessed through channel assessment.

In response to determining that no interference between the communication systems in the shared spectrum is assessed through channel assessment, the duration of the transmission opportunity in the shared spectrum may be increased. In this way, utilization efficiency of the shared spectrum may be enhanced.

In an example, the step that the duration of the transmission opportunity is increased includes the step that two times of a duration of a historical transmission opportunity is determined as a duration of a current transmission opportunity.

The duration of the current transmission opportunity may be adjusted according to a result of channel assessment. In response to determining that no interference between the communication systems is found through channel assessment, two times of the duration of the historical transmission opportunity may serve as the duration of the current transmission opportunity. In this way, occupation time of the shared spectrum may be prolonged for data communication, and then utilization efficiency of the shared spectrum may be enhanced.

Figure 5:
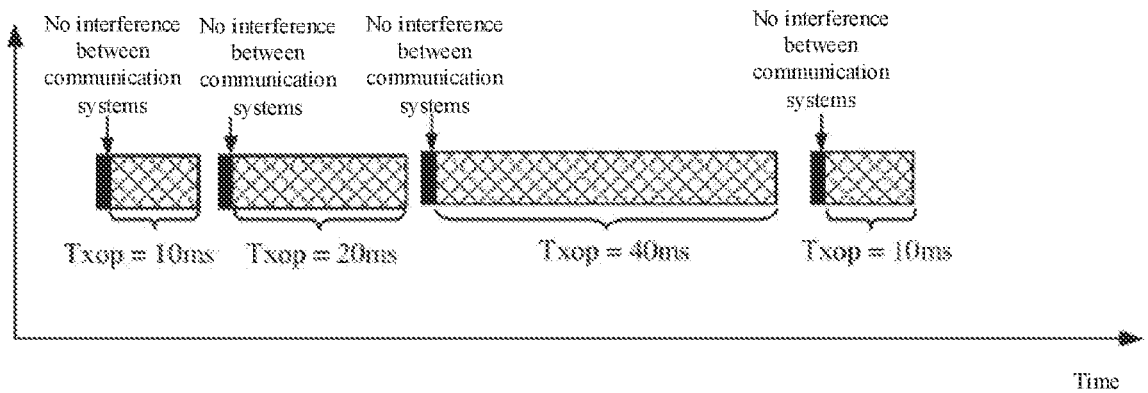
FIG. 5 is a schematic diagram of transmission opportunity (Txop) determination shown according to an example.

As shown in FIG. 5, in response to determining that no interference between the communication systems is assessed through the current channel assessment, the duration of the current transmission opportunity (Txop) is two times that of the historical Txop.

In an example, the step that a duration of a transmission opportunity in the shared spectrum is determined according to the interference condition between the communication systems includes:

the duration of the current transmission opportunity is updated according to a duration of an initial transmission opportunity in response to determining that interference between the communication systems in the shared spectrum is assessed through the channel assessment.

In response to determining that interference between the communication systems in the shared spectrum is assessed through channel assessment, the duration of the initial transmission opportunity may be updated to the duration of the current transmission opportunity.

The duration of the initial transmission opportunity may be a duration of a transmission opportunity negotiated by different systems. The duration of the initial transmission opportunity may be used to make the local communication system and the external communication system have a fair opportunity to use the shared spectrum.

The duration of the initial transmission opportunity is usually short. The local communication system may use the duration of the initial transmission opportunity in initial channel assessment. In response to determining that no interference between the communication systems is assessed in a historical channel assessment process, a transmission opportunity having a longer duration than the initial transmission opportunity may be used for data transmission, and the duration of the transmission opportunity is taken as a duration of a transmission opportunity used after subsequent channel assessment, that is, for the current channel assessment, the duration is the duration of the current transmission opportunity. In response to determining that interference between the communication systems is assessed in a current channel assessment process, the duration of the current transmission opportunity may be set to be the same as that of the initial transmission opportunity, that is, the duration of the current transmission opportunity is updated according to the duration of the initial transmission opportunity, and data transmission is performed on the duration of the initial transmission opportunity. In this way, the local communication system and the external communication system may fairly occupy the shared spectrum, and fairness of resource use is improved.

A specific example is provided below with reference to any of the above examples:

the example provides two methods to improve communication efficiency of a shared spectrum:

Method 1: an on-demand channel assessment mechanism is involved. Channel assessment is performed as needed.

In the method, a sender performs channel assessment as needed. Under the condition that systems interfere with each other, channel assessment is needed. Here, the sender includes a base station, a terminal, etc.

In a first case, in the shared spectrum, a cellular mobile communication system interferes with a Wi-Fi system.

In an implementation method, in response to determining that the sender knows that there are no interference between systems on the spectrum based on preset configuration information, the base station and terminal do not need to perform channel assessment. For example, in response to determining that the sender knows that there is no Wi-Fi system in a shared spectrum, the sender works in the shared spectrum without performing channel assessment.

In another implementation method, the sender may periodically detect existence of a predefined signal. After a predefined rule is satisfied, the sender may stop channel assessment. For example, in response to determining that no predefined signal is detected in a predefined time period, channel assessment is stopped. Alternatively, in response to determining that no predefined signal is detected in continuous predefined times, the sender stops channel assessment. Time, a period and signal lamp feature information for detecting a predefined signal are known or configured in advance.

In a second case, there may be interference between two cellular mobile communication systems.

In an implementation method, in response to determining that different cellular communication systems interfere with each other, channel assessment may be avoided through coordination. For example, when base stations belonging to different operators interfere with each other, the base stations may coordinate time of using a frequency domain resource by each base station in a shared spectrum and pattern information of the frequency domain resource through interfaces between the base stations (if any). Alternatively, when a base station of Operator 1 finds an interfering base station of Operator 2, the base station may determine a work resource according to a predefined pattern.

Method 2: an improved channel assessment mechanism is involved.

In the method, a sender still has to perform channel assessment before occupying a channel resource, but a parameter for channel occupation or channel assessment may be flexibly adjusted.

In an implementation method, as shown in FIG. 5, a size of Txop may be adjusted according to a result of channel assessment, and a time length of Txop may be doubled every time no interference between systems is found in channel assessment. After interference between systems is found through channel assessment, time of Txop is reduced to predefined time. As shown in the figure below. In another implementation method, parameters for channel assessment, such as a size of a back-off window, may be further adjusted.

Figure 6:
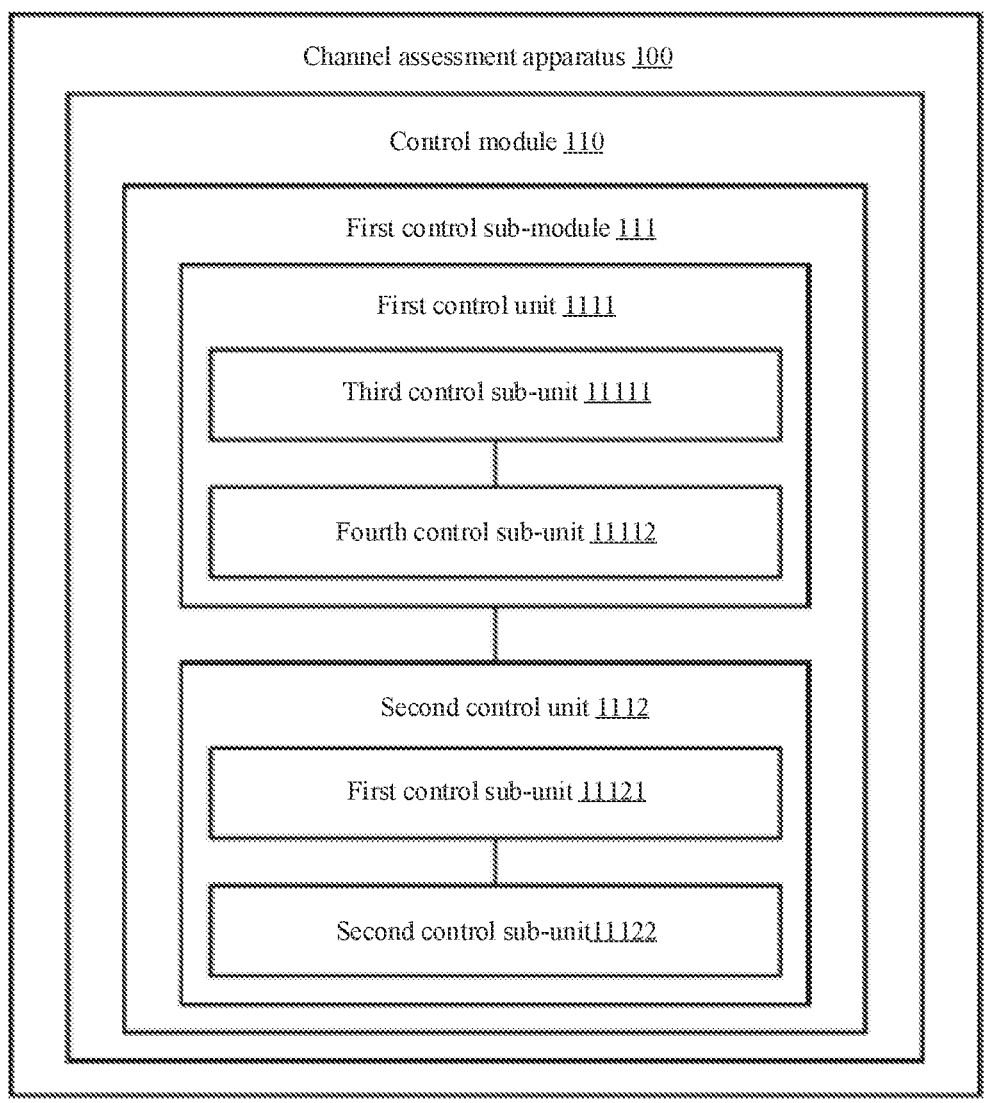
FIG. 6 is a schematic flow chart of a channel assessment method shown according to an example.

An example of the disclosure further provides a channel assessment apparatus applied to a base station and/or terminal or other communication devices of a local communication system. FIG. 6 is a schematic structural diagram of components of a channel assessment apparatus 100 provided by an example of the disclosure. As shown in FIG. 6, the apparatus 100 includes: a control module 110.

The control module 110 is configured to perform channel assessment in a shared spectrum, and alternatively, to determine a channel resource occupied in the shared spectrum according to an interference condition between communication systems.

In an example, the control module 110 includes:
a first control sub-module 111 configured to stop the channel assessment in the shared channel in response to determining that there is no interference between the communication systems in the shared spectrum.

In an example, the first control sub-module 111 includes:
a first control unit 1111 configured to stop the channel assessment in response to determining that there is no interference between the communication systems in the shared spectrum according to configuration information; and
alternatively,
a second control unit 1112 configured to stop the channel assessment in response to determining that there is no interference between the communication systems in the shared spectrum according to a radio signal detection result of an external communication system.

In an example, the second control unit 1112 includes at least one of the following:
a first control sub-unit 11121 configured to determine that there is no interference between the communication systems in the shared spectrum in response to determining that no radio signal transmitted from the external communication system is detected in a measurement period; and
a second control sub-unit 11122 configured to determine that there is no interference between the communication systems in the shared spectrum in response to determining that it is not detected that the continuous number of radio signals transmitted from the external communication system is greater than or equal to a number threshold.

In an example, the first control unit 1111 includes at least one of the following:
a third control sub-unit 11111 configured to determine that no external communication system uses the shared spectrum according to the configuration information; and
a fourth control sub-unit 11112 configured to determine that a channel resource of the shared spectrum used by the external communication system is different from a channel resource of the shared spectrum used by a local communication system according to the configuration information, where the channel resource includes: a time domain resource and/or a frequency domain resource.

In an example, the channel resource of the shared spectrum used by the local communication system and the channel resource of the shared spectrum used by the external communication system are agreed by the local communication system and the external communication system; and
alternatively,
the channel resource of the shared spectrum used by the local communication system and the channel resource of the shared spectrum used by the external communication system are preset.

Figure 7:
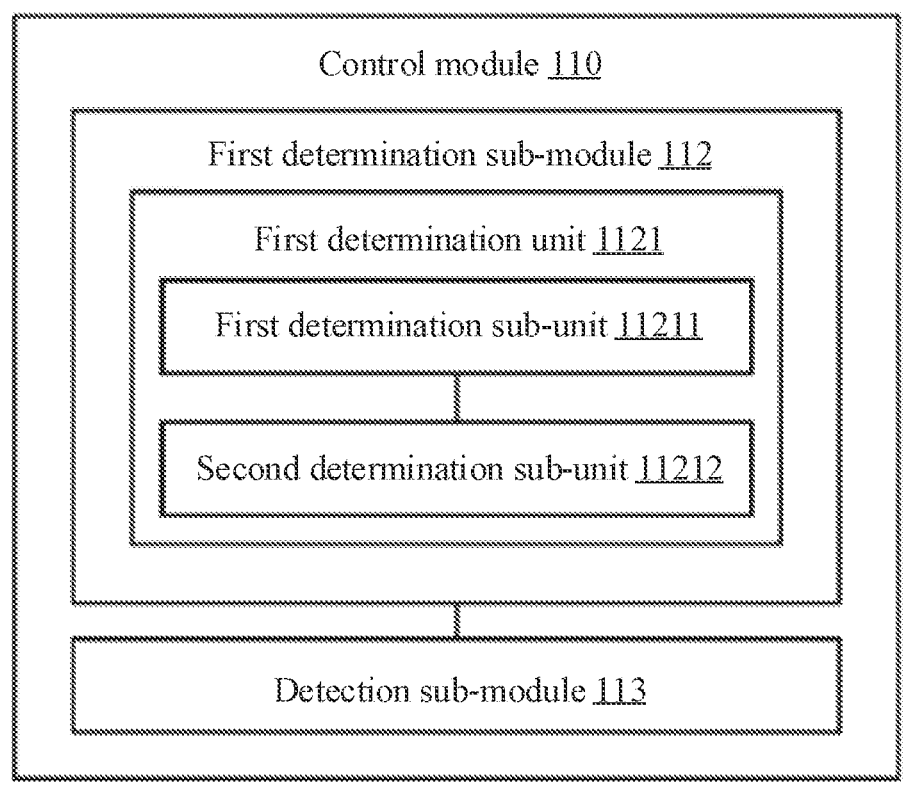
FIG. 7 is a schematic flow chart of another channel assessment method shown according to an example.

In an example, as shown in FIG. 7, the control module 110 includes:
a first determination sub-module 112 configured to determine an assessment parameter according to the interference condition between the communication systems in response to determining that there is interference between the communication systems in the shared spectrum; and
a detection sub-module 113 configured to perform the channel assessment in the shared spectrum according to the assessment parameter.

In an example, the first determination sub-module 112 includes:
a first determination unit 1121 configured to determine an assessment parameter for current channel assessment according to the interference condition between the communication systems assessed through historical channel assessment.

In an example, the assessment parameter includes: a back-off parameter.

In an example, the back-off parameter includes: a back-off duration.

The first determination unit 1121 includes:
a first determination sub-unit 11211 configured to reduce a back-off duration of the current channel assessment in response to determining that no interference between the communication systems in the shared spectrum is assessed through the historical channel assessment; and
a second determination sub-unit 11212 configured to increase the back-off duration of the current channel assessment in response to determining that interference between the communication systems in the shared spectrum is assessed through the historical channel assessment.

Figure 8:
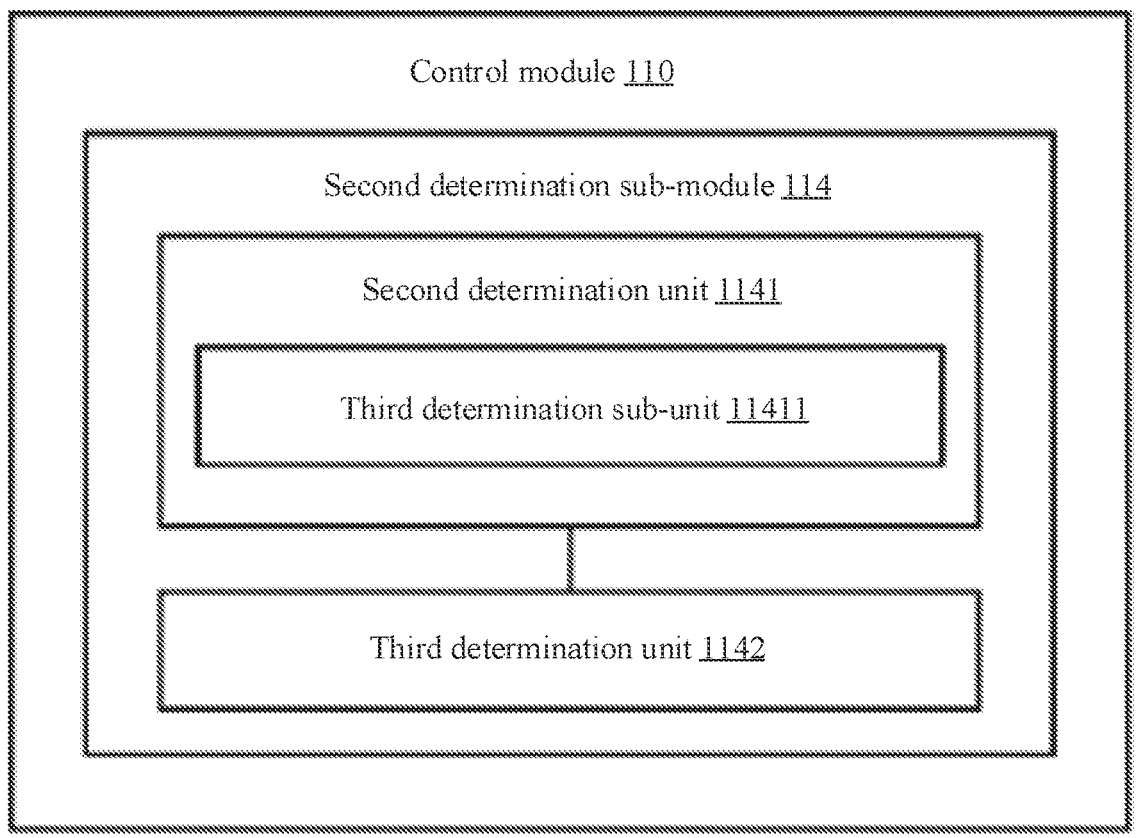
FIG. 8 is a schematic flow chart of still another channel assessment method shown according to an example.

In an example, as shown in FIG. 8, the control module 110 includes:
a second determination sub-module 114 configured to determine a duration of a transmission opportunity in the shared spectrum according to the interference condition between the communication systems.

In an example, the second determination sub-module 114 includes:
a second determination unit 1141 configured to increase the duration of the transmission opportunity in response to determining that no interference between the communication systems in the shared spectrum is assessed through channel assessment.

In an example, the second determination unit 1141 includes:
a third determination sub-unit 11411 configured to determine two times of a duration of a historical transmission opportunity as a duration of a current transmission opportunity.

In an example, the second determination sub-module 114 includes:
a third determination unit 1142 configured to update a duration of a current transmission opportunity according to a duration of an initial transmission opportunity in response to determining that interference between the communication systems in the shared spectrum is assessed through the channel assessment.

In an example, the control module 110, etc. may be implemented by one or more of a central processing unit (CPU), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic elements, and may also be implemented by combining one or more radio frequency (RF) antennas, thus executing the above method.

Figure 9:
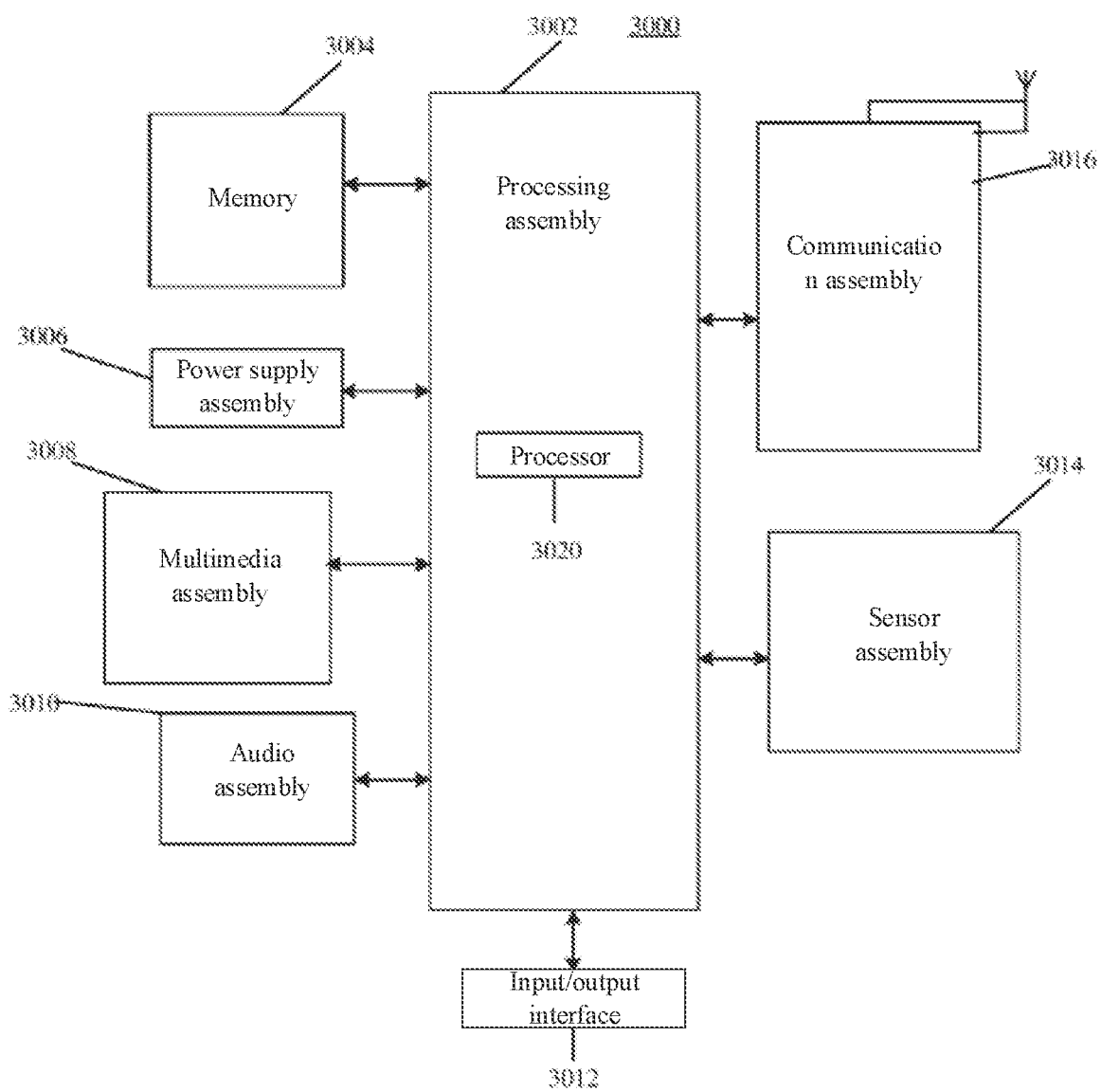
FIG. 9 is a block diagram of a channel assessment apparatus shown according to an example.

FIG. 9 is a block diagram of a channel assessment apparatus 3000 shown according to an example. For example, the apparatus 3000 may be a mobile phone, a computer, a digital broadcast terminal, a message transceiving device, a game console, a tablet device, a medical device, a fitness device, a personal digital assistant, etc.

With reference to FIG. 9, the apparatus 3000 may include one or more of the following assemblies: a processing assembly 3002, a memory 3004, a power supply assembly 3006, a multimedia assembly 3008, an audio assembly 3010, an input/output (I/O) interface 3012, a sensor assembly 3014, and a communication assembly 3016.

The processing assembly 3002 generally controls all operations of the apparatus 3000, such as operations associated with display, telephone call, data communication, camera operations and recording operations. The processing assembly 3002 may include one or more processors 3020 to execute an instruction, so as to complete all or part of the steps of the above method. In addition, the processing assembly 3002 may include one or more modules to facilitate interactions between the processing assembly 3002 and other assemblies. For example, the processing assembly 3002 may include a multimedia module, so as to facilitate interactions between the multimedia assembly 3008 and the processing assembly 3002.

The memory 3004 is configured to store various types of data, so as to support operations at the apparatus 3000. For example, the data include instructions for any application or method operating at the apparatus 3000, contact data, phonebook data, messages, pictures, video, etc. The memory 3004 may be implemented by any type of volatile or non-volatile memory apparatus, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 3006 supplies power to various assemblies of the apparatus 3000. The power supply assembly 3006 may include a power management system, one or more power supplies, and other assemblies associated with generating, managing and distributing power for the apparatus 3000.

The multimedia assembly 3008 includes a screen that provides an output interface between the apparatus 3000 and a user. In some examples, the screen may include a liquid crystal display (LCD) and a touch panel (TP). In response to determining that the screen includes the touch panel, the screen may be implemented as a touch screen to receive an input signal from the user. The touch panel includes one or more touch sensors to sense touching, swiping and gestures on the touch panel. In addition to sensing a boundary of a touch or swipe action, the touch sensor may further detect a duration and pressure associated with touch or swipe operations. In some examples, the multimedia assembly 3008 includes a front facing camera and/or a rear facing camera. When the apparatus 3000 is in an operation mode, such as a photographing mode or a video mode, the front facing camera and/or the rear facing camera may receive external multimedia data. Each of the front facing camera and the rear facing camera may be a fixed optical lens system or have a focal length and optical zoom capability.

The audio assembly 3010 is configured to output and/or input an audio signal. For example, the audio assembly 3010 includes a microphone (MIC) configured to receive an external audio signal when the apparatus 3000 is in the operation mode, such as a call mode, a recording mode, and a voice recognition mode. The received audio signal may be further stored in the memory 3004 or sent via the communication assembly 3016. In some examples, the audio assembly 3010 may further include a speaker to output the audio signal.

The I/O interface 3012 provides an interface between the processing assembly 3002 and a peripheral interface module. The peripheral interface module may be a keyboard, a click wheel, a button, etc. The buttons may include, but are not limited to, a home button, a volume button, a start button and a lock button.

The sensor assembly 3014 includes one or more sensors for providing various aspects of state assessment for the apparatus 3000. For example, the sensor assembly 3014 may detect an opened/closed state of the apparatus 3000, and relative location of the assemblies, such as a display and a keypad of the apparatus 3000. The sensor assembly 3014 may further detect a change in location of the apparatus 3000 or an assembly of the apparatus 3000, a contact or not between the user and the apparatus 3000, an orientation or acceleration/deceleration of the apparatus 3000, and a change in temperature of the apparatus 3000. The sensor assembly 3014 may include a proximity sensor configured to detect presence of a nearby object without any physical contact. The sensor assembly 3014 may further include an optical sensor, such as a complementary metal-oxide-semiconductor (CMOS) or charge-coupled device (CCD) image sensor, which is used in imaging applications. In some examples, the sensor assembly 3014 may further include an acceleration sensor, a gyroscope sensor, a magnetic sensor, a pressure sensor, or a temperature sensor.

The communication assembly 3016 is configured to facilitate wired or wireless communication between the apparatus 3000 and other devices. The apparatus 3000 may access a radio network based on a communication standard, such as Wi-Fi, a 2nd generation mobile communication (2G) network or a 3rd generation mobile communication (3G) network, or their combination. In an example, the communication assembly 3016 receives a broadcast signal or broadcast-associated information from an external broadcast management system via a broadcast channel. In an example, the communication assembly 3016 further includes a near field communication (NFC) module, to facilitate short-distance communication. For example, the NFC module may be implemented based on a radio frequency identification (RFID) technology, an infrared data association (IrDA) technology, an ultra wide band (UWB) technology, a Bluetooth (BT) technology, etc.

In an example, the apparatus 3000 may be implemented by one or more of ASIC, DSP, a digital signal processing device (DSPD), PLD, FPGA, a controller, a microcontroller, a microprocessor, or other electronic elements, thus executing the above method.

In an example, there is further provided a non-transitory computer-readable storage medium including an instruction, for example, a memory 3004 including an instruction, and the instruction may be executed by the processor 3020 of the apparatus 3000 so as to execute the above method. For example, the non-transitory computer-readable storage medium may be ROM, a random access memory (RAM), a compact disk (CD)-ROM, a magnetic tape, a floppy disk, an optical data storage device, etc.

Other implementation solutions of the examples of the disclosure will be easily conceived by those skilled in the art in consideration of the description and practice of the disclosure disclosed here. The disclosure is intended to cover any variations, uses or adaptive changes of the examples of the disclosure, which follow the general principles of the examples of the disclosure and include common general knowledge or conventional technical means, which is not disclosed in the examples of the disclosure, in the art. The description and the examples are merely regarded as illustrative, and the true scope and spirit of the examples of the disclosure are indicated by the following claims.

It is to be understood that the examples of the disclosure are not limited to precise structures which have been described above and shown in the accompanying drawings, and may have various modifications and changes without departing from the its scope. The scope of the examples of the disclosure is limited by the appended claims merely.

In a first aspect, an example of the disclosure provides a channel assessment method that is applied to first user equipment (UE). The method includes:
  performing channel assessment in a shared spectrum, and alternatively, determining a channel resource occupied in the shared spectrum according to an interference condition between communication systems.

In an example, the performing channel assessment in a shared spectrum according to an interference condition between communication systems includes:
  stopping the channel assessment in the shared channel in response to determining that there is no interference between the communication systems in the shared spectrum.

In an example, the stopping the channel assessment in response to determining that there is no interference between the communication systems in the shared spectrum includes:
  stopping the channel assessment in response to determining that there is no interference between the communication systems in the shared spectrum according to configuration information; and
  alternatively,
  stopping the channel assessment in response to determining that there is no interference between the communication systems in the shared spectrum according to a radio signal detection result of an external communication system.

In an example, the determining that there is no interference between the communication systems in the shared spectrum according to a radio signal detection result of an external communication system includes at least one of the following:
  determining that there is no interference between the communication systems in the shared spectrum in response to determining that no radio signal transmitted from the external communication system is detected in a measurement period; and
  determining that there is no interference between the communication systems in the shared spectrum in response to determining that it is not detected that a continuous number of radio signals transmitted from the external communication system is greater than or equal to a number threshold.

In an example, the in response to determining that there is no interference between the communication systems in the shared spectrum according to configuration information includes at least one of the following:
   determining that no external communication system uses the shared spectrum according to the configuration information; and
   determining that a channel resource of the shared spectrum used by the external communication system is different from a channel resource of the shared spectrum used by a local communication system according to the configuration information, where the channel resource includes: a time domain resource and/or a frequency domain resource.

In an example, the channel resource of the shared spectrum used by the local communication system and the channel resource of the shared spectrum used by the external communication system are agreed by the local communication system and the external communication system; and alternatively,
   the channel resource of the shared spectrum used by the local communication system and the channel resource of the shared spectrum used by the external communication system are preset.

In an example, the performing channel assessment in a shared spectrum according to an interference condition between communication systems includes:
   determining an assessment parameter according to the interference condition between the communication systems in response to determining that there is interference between the communication systems in the shared spectrum; and
   performing the channel assessment in the shared spectrum according to the assessment parameter.

In an example, the determining an assessment parameter according to the interference condition between the communication systems includes:
   determining an assessment parameter for current channel assessment according to the interference condition between the communication systems assessed through historical channel assessment.

In an example, the assessment parameter includes: a back-off parameter.

In an example, the back-off parameter includes a back-off duration.
   the determining an assessment parameter for current channel assessment according to the interference condition between the communication systems assessed through historical channel assessment includes:
   reducing a back-off duration of the current channel assessment in response to determining that no interference between the communication systems in the shared spectrum is assessed through the historical channel assessment; and
   increasing the back-off duration of the current channel assessment in response to determining that interference between the communication systems in the shared spectrum is assessed through the historical channel assessment.

In an example, the determining a channel resource occupied in the shared spectrum according to an interference condition between communication systems includes:
   determining a duration of a transmission opportunity in the shared spectrum according to the interference condition between the communication systems.

In an example, the determining a duration of a transmission opportunity in the shared spectrum according to the interference condition between the communication systems includes:
   increasing the duration of the transmission opportunity in response to determining that no interference between the communication systems in the shared spectrum is assessed through channel assessment.

In an example, the increasing the duration of the transmission opportunity includes determining two times of a duration of a historical transmission opportunity as a duration of a current transmission opportunity.

In an example, the determining a duration of a transmission opportunity in the shared spectrum according to the interference condition between the communication systems includes:
   updating a duration of a current transmission opportunity according to a duration of an initial transmission opportunity in response to determining that interference between the communication systems in the shared spectrum is assessed through the channel assessment.

In a second aspect, an example of the disclosure provides a channel assessment apparatus. The apparatus includes: a control module.

The control module is configured to perform channel assessment in a shared spectrum, and alternatively, to determine a channel resource occupied in the shared spectrum according to an interference condition between communication systems.

In an example, the control module includes:
   a first control sub-module configured to stop the channel assessment in the shared channel in response to determining that there is no interference between the communication systems in the shared spectrum.

In an example, the first control sub-module includes:
   a first control unit configured to stop the channel assessment in response to determining that there is no interference between the communication systems in the shared spectrum according to configuration information; and
   alternatively,
   a second control unit configured to stop the channel assessment in response to determining that there is no interference between the communication systems in the shared spectrum according to a radio signal detection result of an external communication system.

In an example, the second control unit includes at least one of the following:
   a first control sub-unit configured to determine that there is no interference between the communication systems in the shared spectrum in response to determining that no radio signal transmitted from the external communication system is detected in a measurement period; and
   a second control sub-unit configured to determine that there is no interference between the communication systems in the shared spectrum in response to determining that it is not detected that the continuous number of radio signals transmitted from the external communication system is greater than or equal to a number threshold.

In an example, the first control unit includes at least one of the following:

a third control sub-unit configured to determine that no external communication system uses the shared spectrum according to the configuration information; and a fourth control sub-unit configured to determine that a channel resource of the shared spectrum used by the external communication system is different from a channel resource of the shared spectrum used by a local communication system according to the configuration information, where the channel resource includes: a time domain resource and/or a frequency domain resource.

In an example, the channel resource of the shared spectrum used by the local communication system and the channel resource of the shared spectrum used by the external communication system are agreed by the local communication system and the external communication system; and alternatively, the channel resource of the shared spectrum used by the local communication system and the channel resource of the shared spectrum used by the external communication system are preset.

In an example, the control module includes:

a first determination sub-module configured to determine an assessment parameter according to the interference condition between the communication systems in response to determining that there is interference between the communication systems in the shared spectrum; and a detection sub-module configured to perform the channel assessment in the shared spectrum according to the assessment parameter.

In an example, the first determination sub-module includes:

a first determination unit configured to determine an assessment parameter for current channel assessment according to the interference condition between the communication systems assessed through historical channel assessment.

In an example, the assessment parameter includes: a back-off parameter.

In an example, the back-off parameter includes: a back-off duration.

The first determination unit includes:

a first determination sub-unit configured to reduce a back-off duration of the current channel assessment in response to determining that no interference between the communication systems in the shared spectrum is assessed through the historical channel assessment; and a second determination sub-unit configured to increase the back-off duration of the current channel assessment in response to determining that interference between the communication systems in the shared spectrum is assessed through the historical channel assessment.

In an example, the control module includes:

a second determination sub-module configured to determine a duration of a transmission opportunity in the shared spectrum according to the interference condition between the communication systems.

In an example, the second determination sub-module includes:

a second determination unit configured to increase the duration of the transmission opportunity in response to determining that no interference between the communication systems in the shared spectrum is assessed through channel assessment.

In an example, the second determination unit includes:

a third determination sub-unit configured to determine two times of a duration of a historical transmission opportunity as a duration of a current transmission opportunity.

In an example, the second determination sub-module includes:

a third determination unit configured to update a duration of a current transmission opportunity according to a duration of an initial transmission opportunity in response to determining that interference between the communication systems in the shared spectrum is assessed through the channel assessment.

In a third aspect, an example of the disclosure provides a communication device. The device includes a processor, a transceiver, a memory, and an executable program that is stored in the memory and runnable by the processor, the processor is configured to execute the executable program to:

perform channel assessment in a shared spectrum, and alternatively, determine a channel resource occupied in the shared spectrum according to an interference condition between communication systems.

In an example, the processor is configured to:

stop the channel assessment in the shared channel in response to determining that there is no interference between the communication systems in the shared spectrum.

In an example, the processor is further configured to:

stop the channel assessment in response to determining that there is no interference between the communication systems in the shared spectrum according to configuration information; and alternatively, stop the channel assessment in response to determining that there is no interference between the communication systems in the shared spectrum according to a radio signal detection result of an external communication system.

In an example, the processor is further configured to:

determining that there is no interference between the communication systems in the shared spectrum in response to determining that no radio signal transmitted from the external communication system is detected in a measurement period; and alternatively, determining that there is no interference between the communication systems in the shared spectrum in response to determining that it is not detected that the continuous number of radio signals transmitted from the external communication system is greater than or equal to a number threshold.

In an example, the processor is further configured to:

determining that no external communication system uses the shared spectrum according to the configuration information; and alternatively, determining that a channel resource of the shared spectrum used by the external communication system is different from a channel resource of the shared spectrum used by a local communication system according to the configuration information, wherein the channel resource comprises: a time domain resource and/or a frequency domain resource.

In a fourth aspect, an example of the disclosure provides a non-transitory computer-readable storage medium that stores an executable program, a processor is configured to execute the executable program to:

perform channel assessment in a shared spectrum, and alternatively, determine a channel resource occupied in the shared spectrum according to an interference condition between communication systems.

The invention claimed is:

1. A channel assessment method, comprising:
performing channel assessment in a shared spectrum, and alternatively, determining a channel resource occupied in the shared spectrum according to an interference condition between communication systems,
wherein the performing channel assessment in a shared spectrum according to an interference condition between communication systems comprises:
stopping the channel assessment in a shared channel in response to determining that there is no interference between the communication systems in the shared spectrum according to configuration information; and
alternatively,
stopping the channel assessment in response to determining that there is no interference between the communication systems in the shared spectrum according to a radio signal detection result of an external communication system.

2. The channel assessment method according to claim 1, wherein the determining that there is no interference between the communication systems in the shared spectrum according to a radio signal detection result of an external communication system comprises at least one of the following:
determining that there is no interference between the communication systems in the shared spectrum in response to determining that no radio signal transmitted from the external communication system is detected in a measurement period; and
determining that there is no interference between the communication systems in the shared spectrum in response to determining that it is not detected that a continuous number of radio signals transmitted from the external communication system is greater than or equal to a number threshold.

3. The channel assessment method according to claim 1, wherein the in response to determining that there is no interference between the communication systems in the shared spectrum according to configuration information comprises at least one of the following:
determining that no external communication system uses the shared spectrum according to the configuration information; and
determining that a channel resource of the shared spectrum used by the external communication system is different from a channel resource of the shared spectrum used by a local communication system according to the configuration information, wherein the channel resource comprises: a time domain resource and/or a frequency domain resource.

4. The channel assessment method according to claim 3, wherein
the channel resource of the shared spectrum used by the local communication system and the channel resource of the shared spectrum used by the external communication system are agreed by the local communication system and the external communication system; and alternatively,
the channel resource of the shared spectrum used by the local communication system and the channel resource of the shared spectrum used by the external communication system are preset.

5. The channel assessment method according to claim 1, wherein the performing channel assessment in a shared spectrum according to an interference condition between communication systems comprises:
determining an assessment parameter according to the interference condition between the communication systems; and
performing the channel assessment in the shared spectrum according to the assessment parameter.

6. The channel assessment method according to claim 3, wherein the determining an assessment parameter according to the interference condition between the communication systems comprises:
determining an assessment parameter for current channel assessment according to the interference condition between the communication systems assessed through historical channel assessment.

7. The channel assessment method according to claim 6, wherein the assessment parameter comprises: a back-off parameter.

8. The channel assessment method according to claim 7, wherein the back-off parameter comprises a back-off duration; and
the determining an assessment parameter for current channel assessment according to the interference condition between the communication systems assessed through historical channel assessment comprises:
reducing a back-off duration of the current channel assessment in response to determining that no interference between the communication systems in the shared spectrum is assessed through the historical channel assessment; and
increasing the back-off duration of the current channel assessment in response to determining that interference between the communication systems in the shared spectrum is assessed through the historical channel assessment.

9. The channel assessment method according to claim 1, wherein the determining a channel resource occupied in the shared spectrum according to an interference condition between communication systems comprises:
determining a duration of a transmission opportunity in the shared spectrum according to the interference condition between the communication systems.

10. The channel assessment method according to claim 9, wherein the determining a duration of a transmission opportunity in the shared spectrum according to the interference condition between the communication systems comprises:
increasing the duration of the transmission opportunity in response to determining that no interference between the communication systems in the shared spectrum is assessed through channel assessment.

11. The channel assessment method according to claim 10, wherein the increasing the duration of the transmission opportunity comprises determining two times of a duration of a historical transmission opportunity as a duration of a current transmission opportunity.

12. The channel assessment method according to claim 9, wherein the determining a duration of a transmission opportunity in the shared spectrum according to the interference condition between the communication systems comprises:
updating a duration of a current transmission opportunity according to a duration of an initial transmission opportunity in response to determining that interference between the communication systems in the shared spectrum is assessed through the channel assessment.

13. A communication device, comprising a processor, a transceiver, a memory and an executable program that is stored in the memory and runnable by the processor, wherein the processor is configured to execute the executable program to:

perform channel assessment in a shared spectrum, and alternatively, determine a channel resource occupied in the shared spectrum according to an interference condition between communication systems; and stop the channel assessment in a shared spectrum in response to determining that there is no interference between the communication systems in the shared spectrum according to configuration information, and alternatively, stop the channel assessment in response to determining that there is no interference between the communication systems in the shared spectrum according to a radio signal detection result of an external communication system.

14. The communication device according to claim 13, wherein the processor is further configured to:

determine that there is no interference between the communication systems in the shared spectrum in response to determining that no radio signal transmitted from the external communication system is detected in a measurement period; and alternatively, determine that there is no interference between the communication systems in the shared spectrum in response to determining that it is not detected that a continuous number of radio signals transmitted from the external communication system is greater than or equal to a number threshold.

15. The communication device according to claim 13, wherein the processor is further configured to:

determine that no external communication system uses the shared spectrum according to the configuration information; and alternatively, determine that a channel resource of the shared spectrum used by the external communication system is different from a channel resource of the shared spectrum used by a local communication system according to the configuration information, wherein the channel resource comprises: a time domain resource and/or a frequency domain resource.

16. A non-transitory computer-readable storage medium, storing an executable program, wherein a processor is configured to execute the executable program to:

perform channel assessment in a shared spectrum, and alternatively, determine a channel resource occupied in the shared spectrum according to an interference condition between communication systems; and stop the channel assessment in a shared spectrum in response to determining that there is no interference between the communication systems in the shared spectrum according to configuration information, and alternatively, stop the channel assessment in response to determining that there is no interference between the communication systems in the shared spectrum according to a radio signal detection result of an external communication system.

* * * * *